(12) United States Patent
Park et al.

(10) Patent No.: US 9,470,941 B2
(45) Date of Patent: Oct. 18, 2016

(54) IN-CELL OR ON-CELL TOUCH SENSOR WITH COLOR FILTER ON ARRAY

(75) Inventors: Youngbae Park, San Jose, CA (US); Cheng Chen, Cupertino, CA (US); Shih Chang Chang, Cupertino, CA (US); John Z. Zhong, Cupertino, CA (US)

(73) Assignee: APPLE INC., Cupertino, CA (US)

(*) Notice: Subject to any disclaimer, the term of this patent is extended or adjusted under 35 U.S.C. 154(b) by 237 days.

(21) Appl. No.: 13/213,156

(22) Filed: Aug. 19, 2011

(65) Prior Publication Data

US 2013/0044074 A1 Feb. 21, 2013

(51) Int. Cl.
| | |
|---|---|
| G02F 1/1362 | (2006.01) |
| G02F 1/1333 | (2006.01) |
| G06F 3/041 | (2006.01) |
| G06F 3/044 | (2006.01) |
| G02F 1/1368 | (2006.01) |

(52) U.S. Cl.
CPC .......... *G02F 1/1362* (2013.01); *G02F 1/13338* (2013.01); *G02F 1/136209* (2013.01); *G06F 3/044* (2013.01); *G06F 3/0412* (2013.01); *G02F 2001/13685* (2013.01); *G02F 2001/136218* (2013.01); *Y10T 29/49105* (2015.01)

(58) Field of Classification Search
None
See application file for complete search history.

(56) References Cited

U.S. PATENT DOCUMENTS

| | | | |
|---|---|---|---|
| 4,853,296 A * | 8/1989 | Fukuyoshi | .................... 428/623 |
| 6,204,897 B1 | 3/2001 | Colgan et al. | |
| 6,833,897 B2 | 12/2004 | Lee et al. | |
| 6,847,422 B2 | 1/2005 | Zhang et al. | |
| 7,180,565 B2 * | 2/2007 | Hong et al. | .................... 349/141 |
| 7,522,226 B2 | 4/2009 | Park et al. | |
| 7,643,112 B2 | 1/2010 | Yao et al. | |
| 7,672,142 B2 * | 3/2010 | Wang et al. | .................... 361/789 |
| 7,821,606 B2 | 10/2010 | Ogino | |
| 8,164,698 B2 | 4/2012 | Kim et al. | |
| 8,259,078 B2 | 9/2012 | Hotelling et al. | |
| 8,284,171 B2 | 10/2012 | Tanaka et al. | |
| 8,471,828 B2 * | 6/2013 | Liu | ............................ 345/174 |
| 8,477,251 B2 | 7/2013 | Lee et al. | |
| 2004/0183989 A1 | 9/2004 | Kim et al. | |
| 2005/0052582 A1 | 3/2005 | Mai | |
| 2008/0062139 A1 * | 3/2008 | Hotelling et al. | ............ 345/173 |
| 2008/0062148 A1 * | 3/2008 | Hotelling et al. | ............ 345/174 |

(Continued)

FOREIGN PATENT DOCUMENTS

| | | |
|---|---|---|
| CN | 101140368 A | 3/2008 |
| EP | 0770971 A2 | 5/1997 |

(Continued)

OTHER PUBLICATIONS

International Search Report and Written Opinion for PCT No. PCT/US2012/051405 dated Nov. 9, 2012; 15 pages.

(Continued)

*Primary Examiner* — Seokyun Moon
(74) *Attorney, Agent, or Firm* — Fletcher Yoder PC

(57) ABSTRACT

Methods and devices employing in-cell and/or on-cell touch sensor components, including in-cell and/or on-cell black matrix material that also may serve as a touch drive or sense electrode, are provided. In one example, an electronic display may include a lower substrate, an upper substrate, and a black matrix material that shields light between pixels of the electronic display. At least a portion of the black matrix material may form all or part of a component of a touch sensor of the electronic display.

28 Claims, 12 Drawing Sheets

(56) References Cited

U.S. PATENT DOCUMENTS

| | | |
|---|---|---|
| 2008/0123039 A1* | 5/2008 | Lee et al. ............... 349/139 |
| 2009/0096760 A1 | 4/2009 | Ma et al. |
| 2009/0128753 A1 | 5/2009 | Shi |
| 2010/0103121 A1* | 4/2010 | Kim et al. ............... 345/173 |
| 2010/0110023 A1 | 5/2010 | Chien et al. |
| 2010/0110351 A1 | 5/2010 | Kim et al. |
| 2010/0134741 A1 | 6/2010 | Jeong et al. |
| 2010/0182273 A1 | 7/2010 | Noguchi et al. |
| 2010/0194707 A1 | 8/2010 | Hotelling et al. |
| 2010/0289765 A1* | 11/2010 | Noguchi ............ G02F 1/13338 345/173 |
| 2010/0321327 A1 | 12/2010 | Liu |
| 2011/0128280 A1 | 6/2011 | Tseng et al. |
| 2011/0242444 A1* | 10/2011 | Song ............... G06F 3/0412 349/43 |
| 2012/0044176 A1* | 2/2012 | Nakamura et al. ........ 345/173 |

FOREIGN PATENT DOCUMENTS

| | | |
|---|---|---|
| JP | 2007-304274 * | 11/2007 |
| KR | 10-2008-0087526 A | 10/2008 |
| KR | 10-2010-0097008 A | 9/2010 |
| KR | 10-1288397 B1 | 7/2013 |
| KR | 10-1340052 B1 | 12/2013 |
| WO | 2007146779 A2 | 12/2007 |
| WO | 2007146783 A1 | 12/2007 |
| WO | 2009049445 A1 | 4/2009 |

OTHER PUBLICATIONS

Australian Office Action for Australian Patent Application No. 2012216285 dated Aug. 6, 2014; 4 pgs.

* cited by examiner

IN-CELL OR ON-CELL TOUCH SENSOR WITH COLOR FILTER ON ARRAY

BACKGROUND

The present disclosure relates generally to electronic displays and, more particularly, to electronic displays having touch screen sensor components and black matrix within or on display pixel cells.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices may employ a variety of user input devices, including buttons, mice, touch sensor panels, touch screens, and so forth. Touch screens, in particular, may be popular because of their ease and versatility of operation. Conventionally, touch screens may be flat panel displays such as liquid crystal displays (LCDs) or organic light emitting diode (OLED) displays overlaid with a touch panel. Such a touch screen may generally recognize the occurrence and position of touches on the screen, enabling the electronic device to respond appropriately.

Many touch screens may be formed from a capacitive touch sensor panel that is overlaid across an LCD. Such a capacitive touch sensor panel may be formed from some matrix of touch drive and touch sense lines made up of substantially transparent conductive material, such as indium tin oxide (ITO). These touch drive and touch sense lines are often arranged in rows and columns on a substantially transparent substrate. When an object, such as a user's finger, is near an intersection of a touch drive line and a touch sense line, a capacitance between the touch drive line and touch sense line may change. This change in capacitance may indicate that a touch is occurring at this location. While overlaying a substantially transparent capacitive touch sensor panel over an LCD may allow light from the LCD to pass through, the capacitive touch sensor panel may cause a non-zero reduction in the brightness of the LCD. Moreover, overlaying an LCD with a capacitive touch sensor panel may add thickness and weight. When touch screen components are integrated into display pixel cells of an LCD to avoid overlaying a discrete capacitive touch sensor panel onto the LCD, the integrated touch screen components may have a relatively high resistance and/or may capacitively couple to other display components. Moreover, though color filters are believed to have been incorporated into twisted-nematic-mode (TN-mode) electronic displays, it may be difficult to adapt the manufacture of such TN-mode electronic displays to manufacture fringe-field-switching-mode (FFS-mode) electronic displays.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to liquid crystal displays (LCDs) and electronic devices incorporating LCDs that employ in-cell and/or on-cell touch sensor components, such as black matrix material within and/or above display pixel cells. Specifically, rather than employ a separate, overlaid touch sensor panel over an LCD panel, embodiments of the present disclosure may incorporate integrated touch sensor components in-cell within display pixel cells of the LCD or on-cell above the display pixel cells. Among other things, these touch sensor components may include a conductive portion of in-cell black matrix, which also may shield light from one pixel from bleeding into another pixel.

By way of example, an electronic display may include a lower substrate, an upper substrate, and a black matrix material that shields light between pixels of the electronic display. At least a portion of the black matrix material may form all or part of a component of a touch sensor of the electronic display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
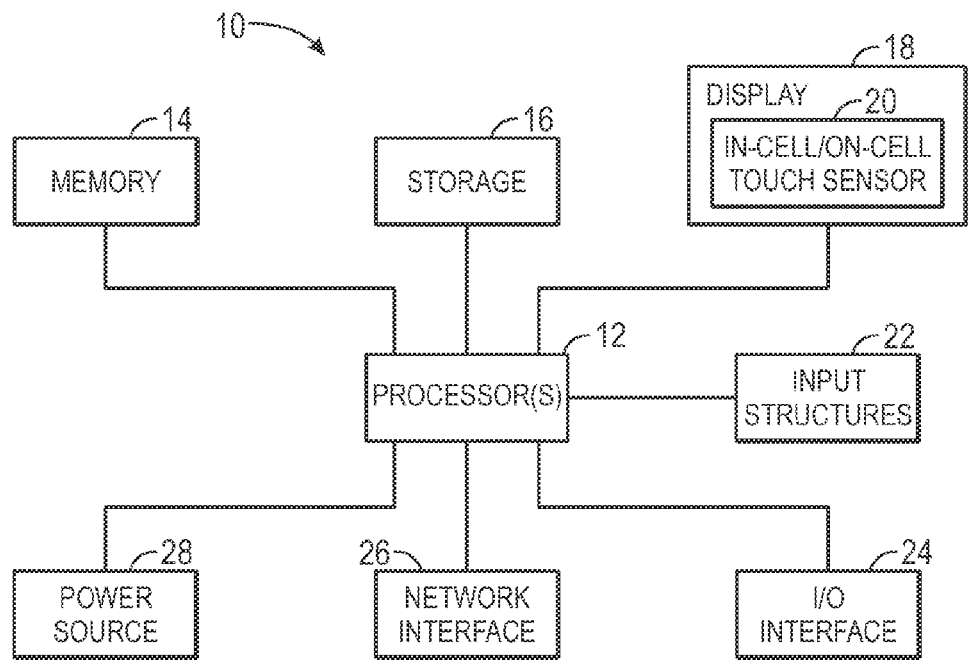
FIG. 1 is a schematic block diagram of an electronic device with a liquid crystal display (LCD) having in-cell touch sensor components and/or in-cell black matrix, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, embodiments of the present disclosure relate to liquid crystal displays (LCDs) and electronic devices incorporating LCDs that employ touch sensor components and black matrix material within display pixel cells ("in-cell") or over display pixel cells ("on-cell"). Specifically, rather than employ a separate, overlaid touch sensor panel over an LCD panel, embodiments of the present disclosure may incorporate integrated touch sensor components in-cell or on-cell relative to display pixel display cells of the LCD. Among other things, these touch sensor components may include a conductive portion of in-cell or on-cell black matrix, which also may shield light from one pixel from bleeding into another pixel. Specifically, a display pixel cell may be understood as formed between a lower substrate, also called a thin film transistor (TFT) glass substrate, and an upper substrate, also called a top glass substrate. A liquid crystal layer may be disposed between the various layers on the inward-facing sides of these upper and lower substrates. Thus, when the black matrix material is generally formed over an inward-facing side of the top glass substrate, the black matrix material may be "in-cell." When the black matrix material is generally formed over an outward-facing side of the top glass substrate, the black matrix material may be referred to as "on-cell."

The touch sensor components generally may include touch drive lines or regions and touch sense lines or regions. Where the touch drive lines or regions and touch sense lines or regions intersect, a capacitive touch pixel may be formed. When an object, such as a user finger, approaches the touch pixel, a capacitance of the between the intersection of the touch drive line or region and touch sense line or region may change. This change in capacitance may indicate that a user touch has occurred at the location of the touch pixel.

Various in-cell layers and/or other structures may form these in-cell touch sensor components. These in-cell touch sensor components may include integrated display panel components serving a secondary role as touch sensor components, as generally disclosed in U.S. Patent Application Publication No. 2010/0194707, "INTEGRATED TOUCH SCREEN," which is assigned to Apple Inc. and which is incorporated by reference herein in its entirety. As such, it should be understood that the touch drive and/or touch sense electrodes may be formed from one or more gate lines of the display, one or more pixel electrodes of the display, one or more common electrodes of the display, one or more source lines of the display, or one or more drains of the display, or some combination of these or other display pixel elements. Additionally or alternatively, at least some conductive portion of an in-cell black matrix material may serve as a touch sensor component or may augment other touch sensor components. Thus, in some embodiments, certain conductive portions of the in-cell black matrix material may serve as touch drive or touch sense electrodes. In other embodiments, certain conductive portions of the in-cell black matrix material may supplement touch drive or touch sense electrodes composed of substantially transparent conductive material (e.g., indium tin oxide (ITO)). Since the conductive portions of the in-cell black matrix material may have a lower resistance than the substantially transparent touch drive or touch sense electrodes, the inclusion of the conductive portions of the in-cell black matrix material may reduce the overall resistance.

In some embodiments, an organic-resin-based color filter may be formed in the thin film transistor (TFT) layer on the TFT glass substrate. That is, rather than using separate color filters formed in a different substrate layer, an organic resin doped to filter different colors may serve as a color filter layer for red, green, and/or blue subpixels as well as a TFT dielectric layer. A fringe-field-switching-mode (FFS-mode) LCD, as disclosed herein, may be particularly well suited to such an organic-resin-based color filter. Specifically, the organic-resin-based color filter may have a relatively low dielectric constant (e.g., around 4), and may remove a need for a separate dielectric layer.

The in-cell touch sensor components, including the black matrix material, may be formed onto an inward-facing side or outward-facing side of the upper substrate, or top glass substrate, rather than be formed in a separate assembly. As used herein, the various layers formed on the inward-facing side or outward-facing side of the top glass substrate may be referred to as the "top glass assembly." By way of example, a touch drive or touch sense electrode and a dielectric layer may be formed on the top glass substrate, and the black matrix deposited onto the dielectric layer. At least some portion of the black matrix material may be conductive and may serve as a corresponding touch drive or touch sense electrode for a touch sensor subsystem of the LCD touch screen.

Figure 2:
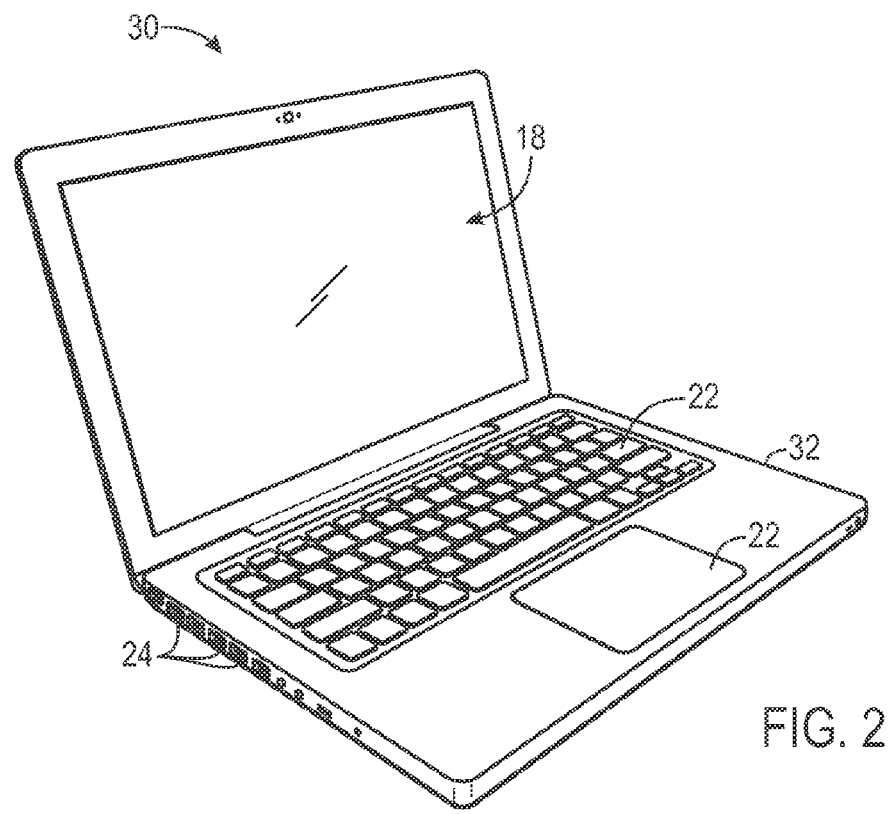
FIG. 2 is a perspective view of a notebook computer representing an embodiment of the electronic device of FIG. 1.
Figure 3:
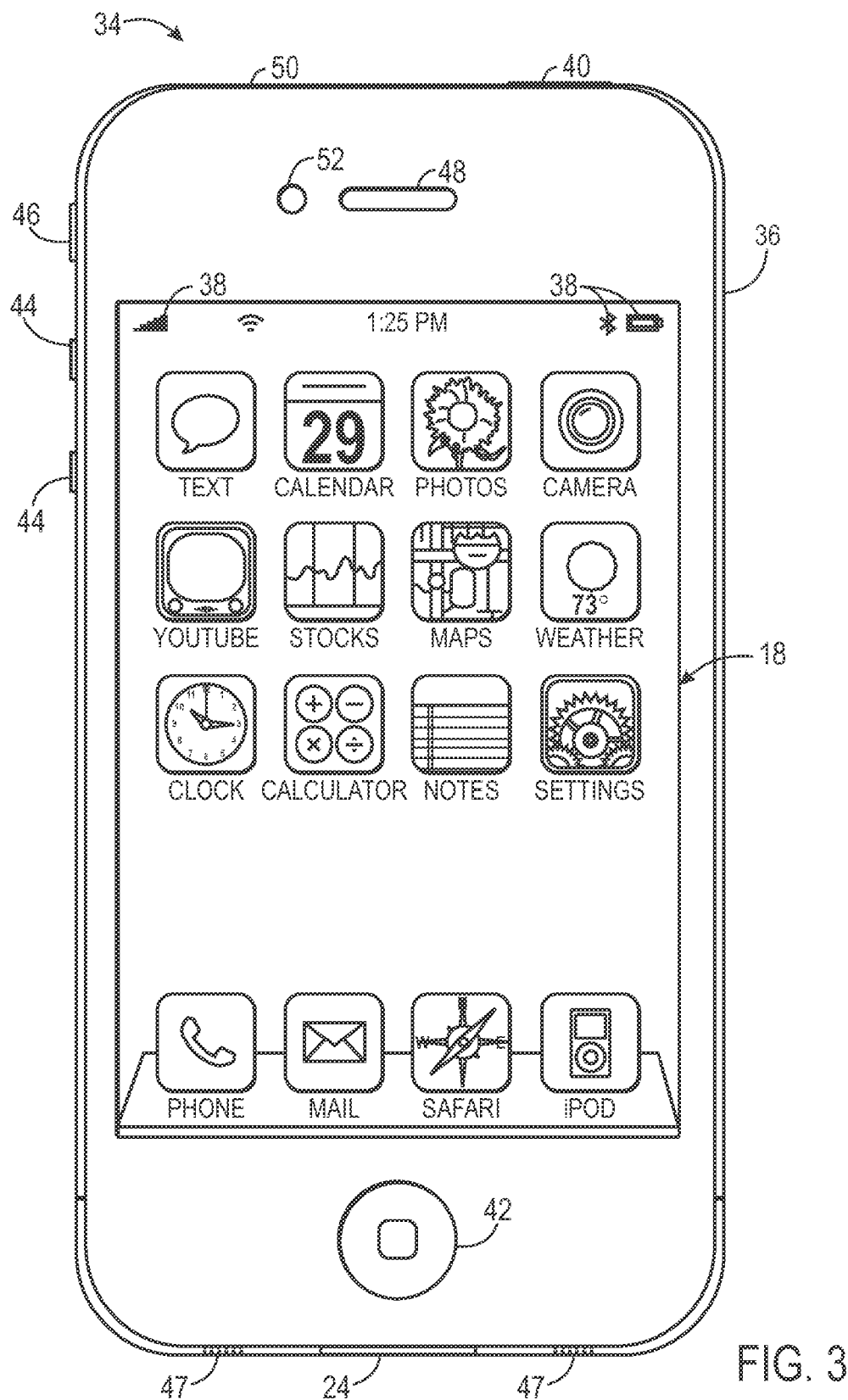
FIG. 3 is a front view of a hand-held device representing another embodiment of the electronic device of FIG. 1.

With the foregoing in mind, a general description of suitable electronic devices that may employ electronic touch screen displays having in-cell or on-cell touch components and black matrix will be provided below. In particular, FIG. 1 is a block diagram depicting various components that may be present in an electronic device suitable for use with such a display. FIGS. 2 and 3 respectively illustrate perspective and front views of suitable electronic device, which may be, as illustrated, a notebook computer or a handheld electronic device.

Turning first to FIG. 1, an electronic device 10 according to an embodiment of the present disclosure may include, among other things, one or more processor(s) 12, memory 14, nonvolatile storage 16, a display 18 having in-cell touch sensor components 20, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms for responding appropriately to a user touch on the display 18. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

The display 18 may be a touch-screen liquid crystal display (LCD), which may enable users to interact with a user interface of the electronic device 10. Various touch sensor components, such as touch sense and/or touch drive electrodes may be located within display pixel cells of the display 18. As mentioned above, these in-cell/on-cell touch sensor 20 components may include integrated display panel components serving a secondary role as touch sensor components. As such, it should be understood that the in-cell/on-cell touch sensor 20 components may be formed from a gate line of the display, a pixel electrode of the display, a common electrode of the display, a source line of the display, or a drain line of the display, or some combination of these elements. Additionally or alternatively, at least some conductive portion of an in-cell black matrix material may serve as a component or supplementary to a component of the in-cell/on-cell touch sensor 20. In some embodiments, the in-cell/on-cell touch sensor 20 may be a MultiTouch™ display allowing multiple touches to be detected on the display 18 at once.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In one embodiment, the input structures 22 (such as a keyboard and/or touchpad) may be used to interact with the computer 30, such as to start, control, or operate a GUI or applications running on computer 30. For example, a keyboard and/or touchpad may allow a user to navigate a user interface or application interface displayed on display 18. The display 18 may be relatively thin and/or bright, as the in-cell/on-cell touch sensor 20 may not require an additional capacitive touch panel overlaid on it.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate user interface 20 to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. As mentioned above, the display 18 may be relatively thin and/or bright, as the in-cell/on-cell touch sensor 20 may not require an additional capacitive touch panel overlaid on it.

Figure 4:
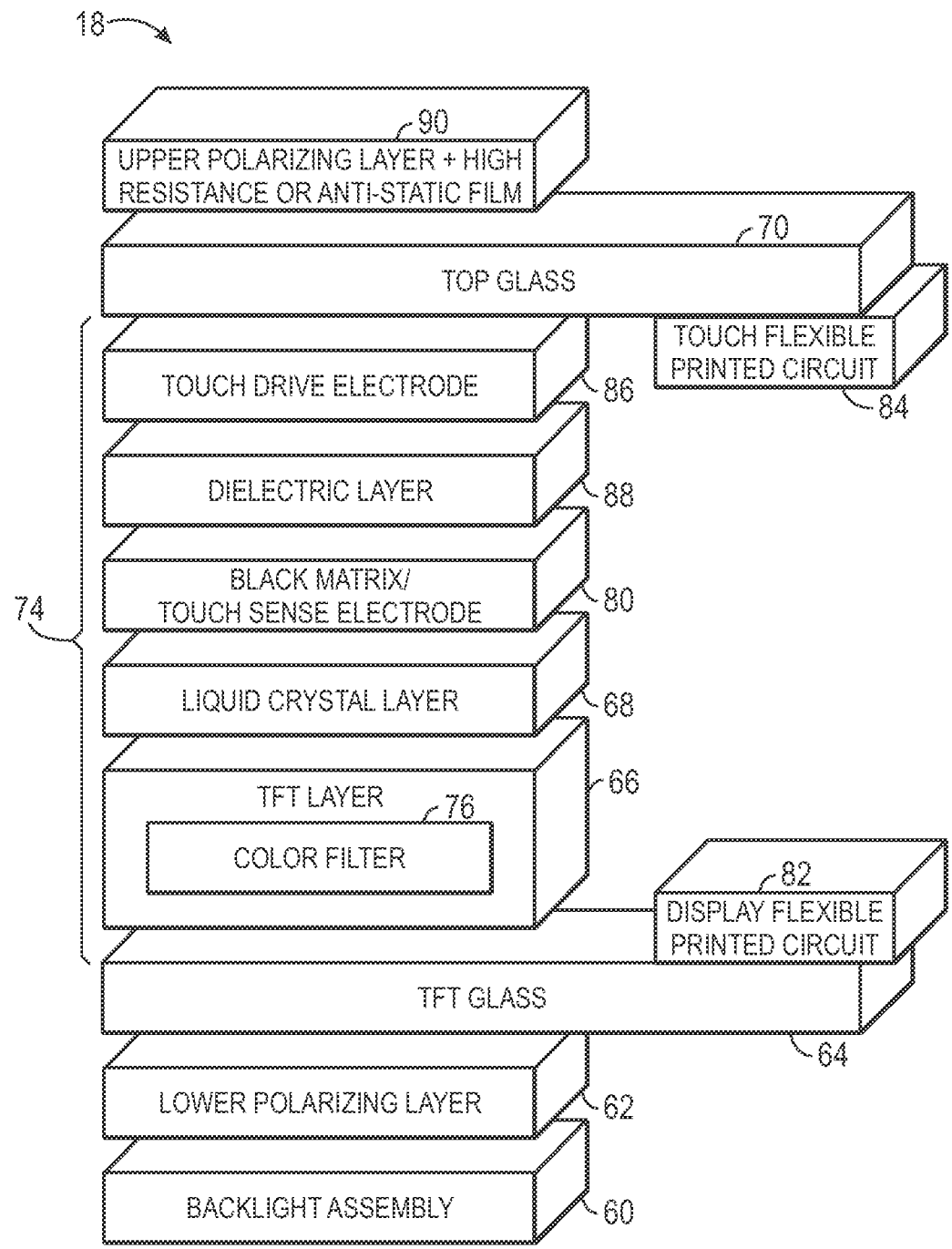
FIGS. 4-6 are exploded views of various layers of an LCD having in-cell touch sensor components and/or black matrix serving as a touch sensor component, in accordance with embodiments.
Figure 5:
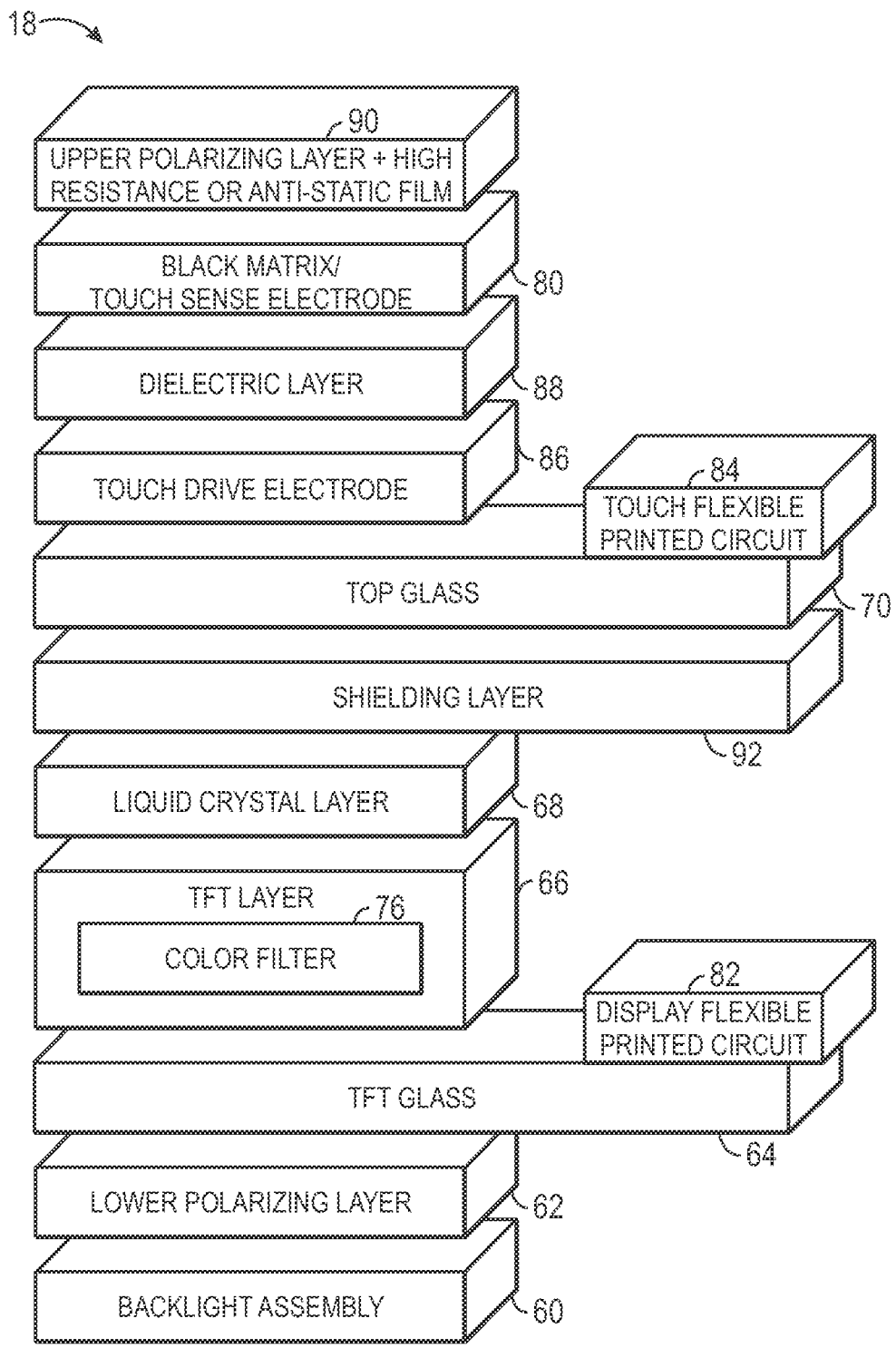
Figure 6:
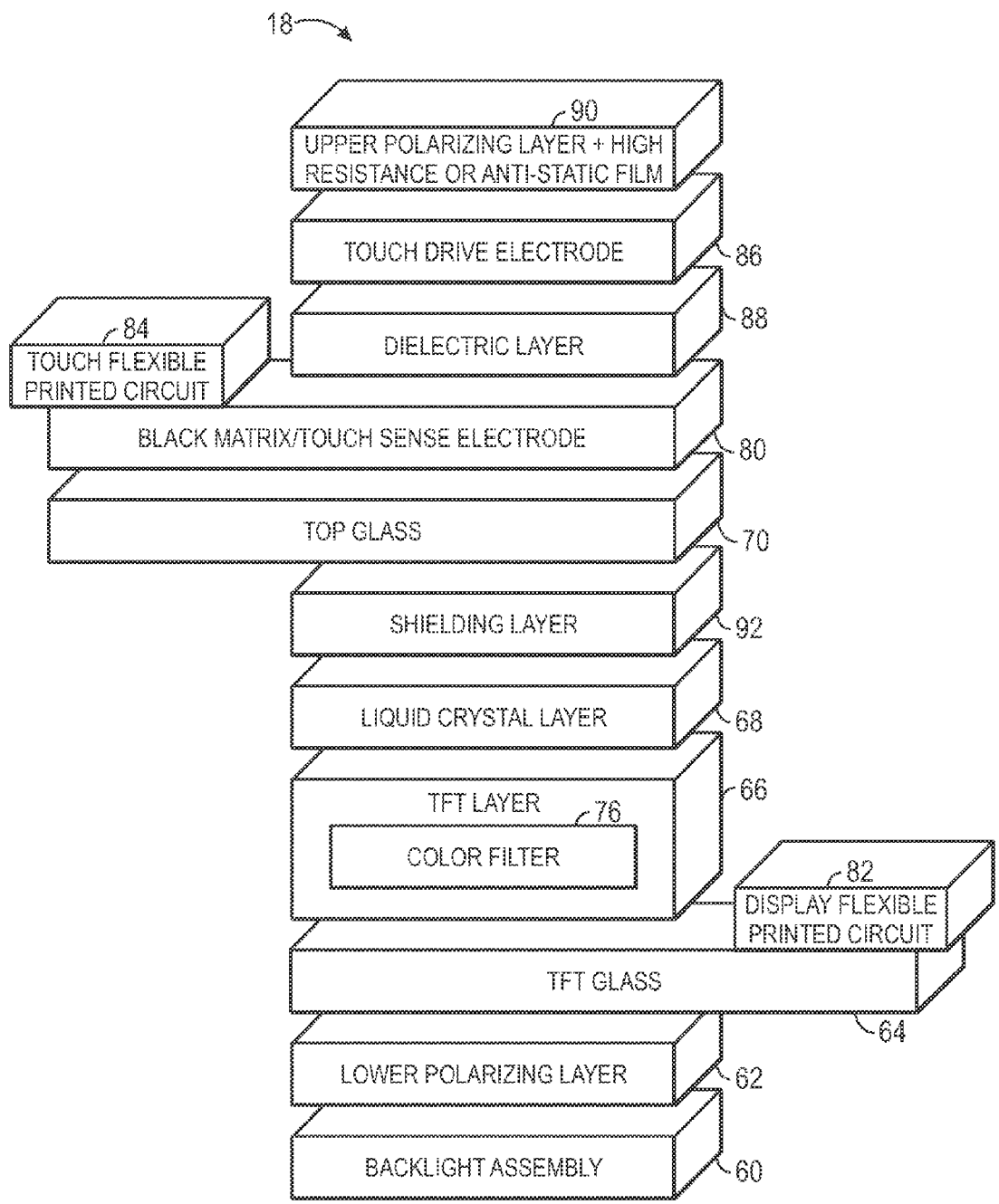

The display 18 may include a variety of layers. FIGS. 4-6 depict block diagram exploded views of different layers that may appear in the display 18. The embodiments of FIGS.

4-6 describe various configurations of in-cell/on-cell touch sensor 20 components. Indeed, FIGS. 4-6 illustrate embodiments having a backlight assembly 60, a lower polarizing layer 62, a lower substrate, or thin film transistor (TFT) glass substrate 64, a thin film transistor (TFT) layer 66, a liquid crystal layer 68, an upper substrate, or top glass substrate 70, black matrix/touch sense electrode 80, touch sensor dielectric layer 88, touch drive electrode 86, and an upper polarizing filter plus high resistance or anti-static film 90. In FIG. 4, in-cell/on-cell touch sensor 20 components, including the black matrix/touch sensor electrode 80, the touch sensor dielectric layer 88, and touch drive electrode 86, are illustrated as being formed on the inward-facing side of the top glass substrate 60. In FIGS. 5 and 6, on-cell touch sensor 20 components, including the black matrix/touch sensor electrode 80, the touch sensor dielectric layer 88, and touch drive electrode 86, are illustrated as being formed in the outward-facing side of the top glass substrate 60. In addition, in FIGS. 5 and 6, an in-cell/on-cell touch sensor 20 component, a shielding layer 92, is formed on the inward-facing side of the top glass substrate 60.

Turning first to FIG. 4, it may be seen that light from the backlight assembly 60 may pass through the lower polarizing layer 62, the thin film transistor (TFT) glass substrate 64, the TFT layer 66, and into the liquid crystal layer 68. The liquid crystal layer 68 may include liquid crystal particles or molecules suspended in a fluid or gel matrix. The liquid crystal particles may be oriented or aligned by an electrical field generated in the TFT layer 66. The orientation of the liquid crystal particles in the liquid crystal layer 68 may ultimately impact the amount of light emitted through pixels of the display 18. Specifically, the amount and/or polarity of light that exits the liquid crystal layer 68 and out through the top glass substrate 70 and high-resistance film 72 may be dependent on the electrical field generated in the TFT layer 66. Thus, by modulating the electrical field applied to the liquid crystal layer 68, the amount of light transmitted through a pixel of the display 18 may be varied accordingly.

Although the TFT glass substrate 64 is described as glass, the TFT glass substrate 64 may alternatively be formed from any suitable light-transparent material, such as quartz and/or plastic. The TFT layer 66 may be formed on the inward-facing side of the TFT glass substrate 64 using any suitable techniques, including deposition, etching, doping, and so forth. As will be described below, the TFT layer 66 may include a variety of conductive, non-conductive, and semi-conductive layers and structures that generally form the electrical devices and pathways driving the operation of pixels of the display 18. To allow light from the backlight assembly 60 to pass through the TFT layer 66, the TFT layer 66 generally may be formed from light-transparent materials, with few exceptions (e.g., black matrix).

The TFT layer 66 may include respective data lines (also referred to as source lines), scanning lines (also referred to as gate lines), pixel electrodes, and common electrodes, as well as other conductive traces and structures that may be found in the display 18. In light-transmissive portions of the display 18, these conductive structures may be formed using transparent conductive materials such as Indium Tin Oxide (ITO). In addition, the TFT layer 66 may include various layers for forming a thin film transistor (TFT), which may be used to provide a video data signal to TFTs thin film transistors (TFTs). Such a video data signal may cause TFTs to pass a certain voltage to pixel electrodes of the display 18, generating an electrical field that modulates the liquid crystal layer 68. In this way, the TFTs may allow more or less light to pass through specific subpixels of the display 18 to generate an image on the display 18. Forming a TFT in the TFT layer 66 may involve installing layers (e.g., a gate insulating film) formed from suitable transparent materials (e.g., silicon oxide) and semi-conductive layers formed from suitable semi-conductor materials (e.g., amorphous silicon). In general, the respective conductive structures and traces, insulating structures, and semi-conductive structures may be suitably disposed to form various pixels of the display 18, including common electrodes, a TFT, and respective source and gate lines used to operate the pixels of display 18, as discussed in greater detail below with respect to FIG. 7.

The structures and/or layers found between the inward-facing side of the top glass substrate and the inward-facing side of the TFT glass substrate may form the "cell" of display pixels of the display 18, as generally indicated by numeral 74. In FIG. 4, the TFT layer 66 formed on the inward-facing side of the TFT glass substrate 64 may include a variety of components to allow the display 18 to be thinner, lighter, and/or brighter than displays that employ separate touch sensor panels. For example, the color filter layer 76, being formed as a component of the TFT layer 66 rather than a separate layer, may be formed from an organic resin that has been doped to filter certain colors (e.g., red, green, or blue). The organic resin used in the color filter layer 76 may serve a dual purpose as an inter-dielectric layer between thin film transistors (TFT) of the TFT layer 66 and common electrode and pixel electrodes of the TFT layer 66, and may have a dielectric constant of around 4 or less.

It should be appreciated that in alternative embodiments, black matrix material formed in the TFT layer 66 may serve as or supplement touch drive electrodes. Additionally or alternatively, the in-cell/on-cell touch sensor 20 components may be formed from one or more pixel electrodes of the display 18, one or more common electrodes of the display 18, one or more source lines of the display 18, or one or more drains of the display 18, or some combination of these elements.

A display flexible printed circuit (FPC) 82 may be bonded to the TFT glass substrate layer 64. The display FPC 82 may be bonded to conductive traces on the TFT glass substrate and may provide signals to control elements of display pixels in the TFT layer 66. For example, as will be descried below, the display FPC 82 may provide data to generate scanning and data signals, also referred to as gate signals and source signals, to cause the pixels of the display 18 to emit certain frequencies of light.

In the embodiment of FIG. 4, in-cell/on-cell touch sensor 20 components may be formed on an inward-facing side of the top glass substrate 70. In particular, the touch drive electrodes 86 may be formed on the inward-facing side of the top glass substrate 70, and the dielectric layer 88 formed over the touch drive electrodes 86. A black matrix material may be formed over the dielectric layer 88, at least some of the black matrix material serving as or supplementing touch sense electrodes as the black matrix/touch sense electrodes 80.

After light passes through the liquid crystal layer 68, the light may continue to pass between the black matrix, including the black matrix/touch sense electrodes 80, through the dielectric layer 88 and touch drive electrode 86, through the top glass substrate 70 and up to an upper polarizing layer 90 coupled to a high resistance and/or anti-static film. As will be discussed below, the high-resistance and/or anti-static film may be formed above or below the upper polarizing layer 90. The touch drive electrodes 86 and the dielectric layer 88 may be formed from substantially transparent materials, such as indium tin oxide (ITO) or any other suitable substantially transparent conductive material. The black matrix/touch sense electrodes 80 may supplement touch sense electrodes formed from a substantially transparent conductive material, such as indium tin oxide (ITO) or any other suitable material. For such embodiments, the black matrix/touch sense electrodes 80 may effectively reduce the overall resistance of touch sense electrodes in the display 18. Because the in-cell/on-cell touch sensor 20 components may be formed on the top glass substrate 70, the touch FPC 84 may be bonded to the top glass substrate 70.

FIGS. 5 and 6 represent alternative embodiments of the display 18. In both FIGS. 5 and 6, on-cell touch sensor 20 components may be formed on an outward-facing side of the top glass substrate 70, and an in-cell/on-cell touch sensor 20 component, a shielding layer 92, may be formed on an inward-facing side of the top glass substrate 70. The shielding layer 92 may be formed from a substantially transparent conductive material (e.g., ITO). By interposing the shielding layer 92 between the on-cell touch sensor 20 components and other display pixel cell 74 components, capacitive coupling may be reduced. Thus, the shielding layer 92 may reduce display and/or touch distortions that could occur from excessive capacitive interaction between these two systems.

In FIG. 5, the touch drive electrode 86 may be disposed onto the top glass substrate 70, above which the dielectric layer 80 may be formed. The black matrix/touch sense electrodes 80 may be formed above the dielectric layer 80. The upper polarizing layer 90 coupled to the high resistance and/or anti-static film may be formed above the black matrix/touch sense electrodes. Because the on-cell touch sensor 20 components may be formed on outward-facing side of the top glass substrate 70, the touch FPC 84 may be bonded to the outward-facing side of the top glass substrate 70.

In FIG. 6, the black matrix/touch sense electrodes 80 may be formed on the outward-facing side of the top glass substrate 70. The dielectric layer 88, the touch drive electrodes 86, and upper polarizing layer 90 coupled to the high resistance and/or anti-static film 90 may be disposed above the on-cell portions of the black matrix/touch sense electrodes 80. In a peripheral portion of the black matrix/touch sense electrodes 80, which are not disposed directly above the display pixel cells, the touch FPC 84 may be bonded directly to the black matrix/touch sense electrodes 80.

Figure 7:
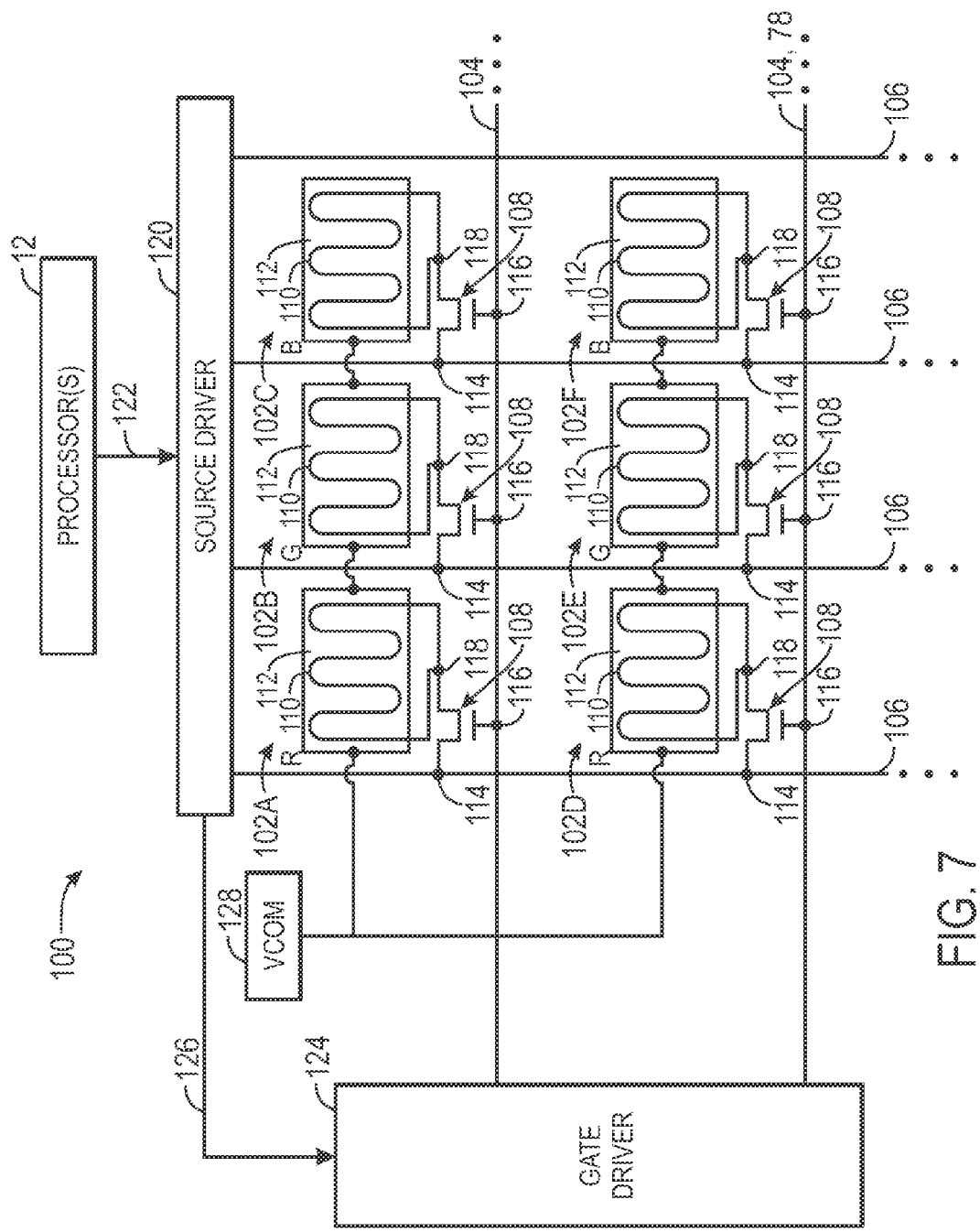
FIG. 7 is a circuit diagram of switching a display circuitry of pixels of an LCD, in accordance with an embodiment.
Figure 8:
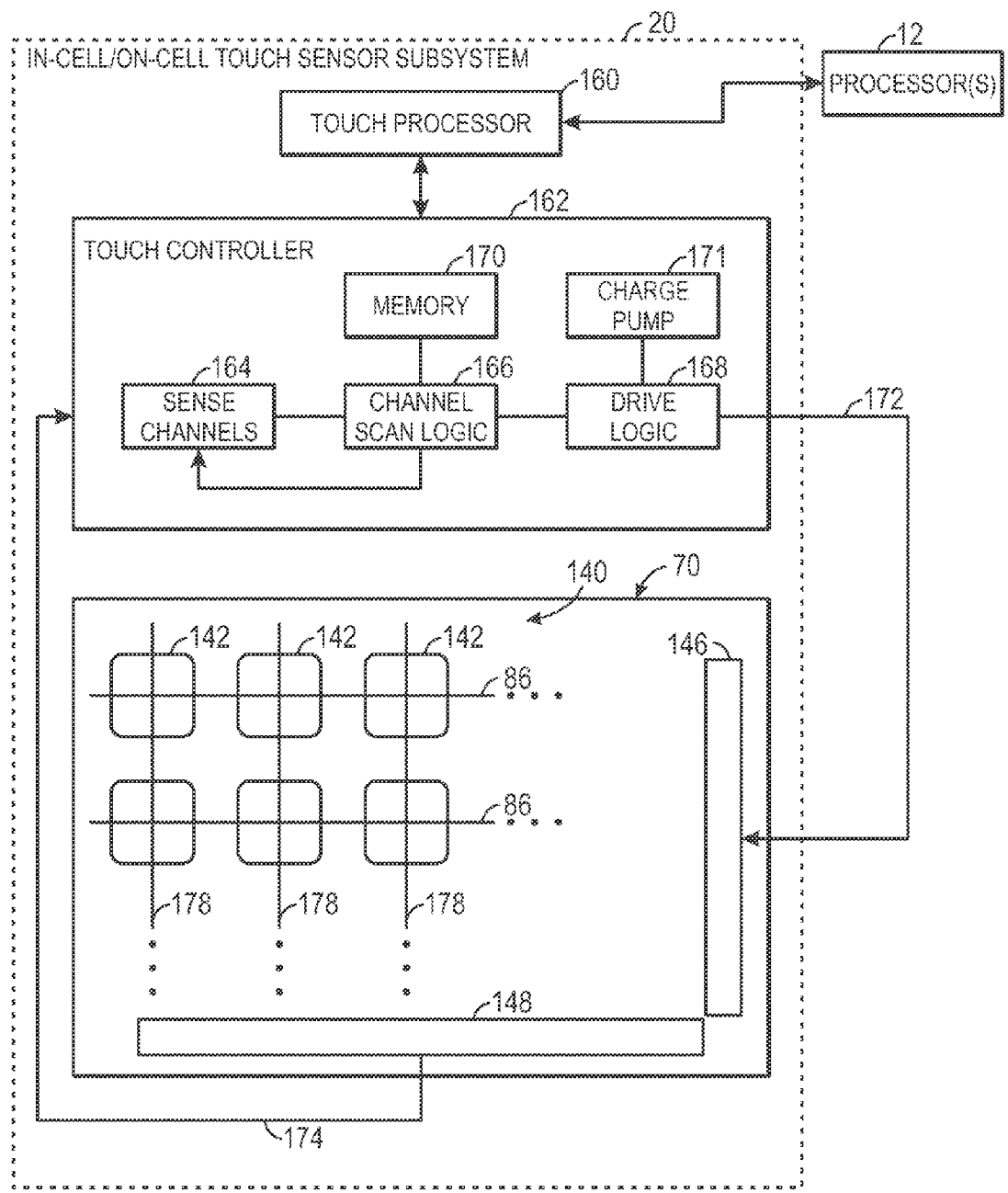
FIG. 8 is a schematic block diagram illustrating an in-cell touch sensor subsystem of an LCD, in accordance with an embodiment.

Among the various components patterned in the TFT layer 66 may be a pixel array 100, as shown in FIG. 7. FIG. 7 generally represents a circuit diagram of certain components of the display 18 in accordance with an embodiment. In particular, the pixel array 100 of the display 18 may include a number of unit pixels 102 disposed in a pixel array or matrix. In such an array, each unit pixel 102 may be defined by the intersection of rows and columns, represented by gate lines 104 (also referred to as scanning lines), and source lines 106 (also referred to as data lines), respectively. Although only 6 unit pixels 102, referred to individually by the reference numbers 102a-102f, respectively, are shown for purposes of simplicity, it should be understood that in an actual implementation, each source line 106 and gate line 104 may include hundreds or thousands of such unit pixels 102. Each of the unit pixels 102 may represent one of three subpixels that respectively filters only one color (e.g., red, blue, or green) of light through the organic-resin-based color filter layer 76 formed in the TFT layer 66. For purposes of the present disclosure, the terms "pixel," "subpixel," and "unit pixel" may be used largely interchangeably.

In the presently illustrated embodiment, each unit pixel 102 includes a thin film transistor 108 for switching a data signal stored on a respective pixel electrode 110. The potential stored on the pixel electrode 110 relative to a potential of a common electrode 112, which may be shared by other pixels 102, may generate an electrical field sufficient to alter the arrangement of the liquid crystal layer 68 (not shown in FIG. 7). In the depicted embodiment of FIG. 7, a source 114 of each TFT 108 may be electrically connected to a source line 106 and a gate 116 of each TFT 108 may be electrically connected to a gate line 104. A drain 118 of each TFT 108 may be electrically connected to a respective pixel electrode 110. Each TFT 108 may serve as a switching element that may be activated and deactivated (e.g., turned on and off) for a predetermined period of time based on the respective presence or absence of a scanning signal on the gate lines 104 that are applied to the gates 116 of the TFTs 108.

When activated, a TFT 108 may store the image signals received via the respective source line 106 as a charge upon its corresponding pixel electrode 110. As noted above, the image signals stored by the pixel electrode 110 may be used to generate an electrical field between the respective pixel electrode 110 and a common electrode 112. The electrical field between the respective pixel electrode 110 and the common electrode 112 may alter the plurality of a liquid crystal layer 68 disposed above the unit pixel 102 (not shown). This electrical field may align the liquid crystal molecules within the liquid crystal layer 68 to modulate life transmission through the pixel 102. Thus, as the electrical field changes, the amount of light passing through the pixel 102 may increase or decrease. In general, light may pass through the unit pixel 102 at an intensity corresponding to the applied voltage from the source line 106.

The display 18 also may include a source driver integrated circuit (IC) 120, which may include a chip, such as a processor or application specific integrated circuit (ASIC) that controls the display pixel array 100 by receiving image data 122 from the processor(s) 12, and sending corresponding image signals to the unit pixels 102 of the pixel array 100. It should be understood that the source driver 120 may be a chip-on-glass (COG) component on the TFT glass substrate 64, a component of the display FPC 82, and/or a component of a printed circuit board (PCB) that is connected to the TFT glass substrate 64 via the display FPC 82. The source driver 120 also may couple to a gate driver integrated circuit (IC) 124 that may activate or deactivate rows of unit pixels 102 via the gate lines 104. As such, the source driver 120 may provide timing signals 126 to the gate driver 124 to facilitate the activation/deactivation of individual rows of pixels 102. In other embodiments, timing information may be provided to the gate driver 124 in some other manner. The display 18 may or may not include a common voltage (Vcom) source 128 to provide a common voltage (Vcom) voltage to the common electrodes 112. In some embodiments, the Vcom source 128 may supply a different Vcom to different common electrodes 112 at different times. In other embodiments, the common electrodes 112 all may be maintained at the same potential (e.g., a ground potential).

As noted above, the in-cell/on-cell touch sensor 20 of the display 18 may operate using certain in-cell and/or on-cell touch sensor components, such as the black matrix/touch sense electrodes 80 formed on the inward-facing side of the top glass substrate 70, as illustrated in FIG. 4, or the black matrix/touch sense electrodes 80 formed on the outward-facing side of the top glass substrate 70, as illustrated in FIGS. 5 and 6. The general operation of such in-cell/on-cell touch sensors 20 will now be described with reference to FIG. 9, which provides one example of the in-cell/on-cell touch sensor 20 employed by the display 18. The in-cell/on-cell touch sensor 20 may interface with the processors 12 of the electronic device 10 through a touch processor 160. In general, the touch processor 160 may communicate the occurrence and position of touches on the display 18, to enable the processors 12 to appropriately respond to such user touches.

The touch processor 160 may be operably coupled to a touch controller 162, which may control the general operation of a touch pixel array 140. As will be discussed further below, the touch pixel array may include an N×M of touch pixels 142 (e.g., a 6×10 matrix of touch pixels 142). The touch controller 162 may include, for example, one or more sense channels 164 (also referred to as an event detection and demodulation circuit), channel scan logic 166, driver logic 168, memory 170, and one or more charge pumps 171. The touch processor 162 may be integrated into a single application specific integrated circuit (ASIC), which may be disposed, for example, in a chip-on-glass (COG) component on the top glass substrate 70, the touch FPC 84, or a printed circuit board (PCB) coupled to the touch FPC 84. The channel scan logic 166 may access the memory 170 and may autonomously read from and/or control the sense channels 164. The channel scan logic 166 additionally may control the driver logic 168 to generate touch drive signals 172 at various frequencies and/or phases to a touch drive interface 146, and a touch sense interface 148 may provide various sense signals 174 to the sense channels 164 in response.

As mentioned above, the touch pixel array 140 includes an M×N matrix of touch pixels 142. These touch pixels 142 arise due to interactions between touch drive electrodes 86 and touch sense electrodes 178 (which may include, for example, the black matrix/touch sense electrodes 80). It should be noted that the terms "lines" and "electrodes" as sometimes used herein simply refers to conductive pathways, and is not intended to be limited to structures that are strictly linear. Rather, the terms "lines" and "electrodes" may encompass pathways that change direction, of different size, shape, materials, and regions. The touch drive electrodes 86 may be driven by touch drive signals 172 from the driver logic 168 of the touch controller 162.

The sense lines 178 may respond differently to the touch drive signals 172 when an object, such as a finger, is located near the confluence of a touch drive electrode 86 and a touch sense electrode 178. The presence of the object may be "seen" by the touch drive pixel 142 that results. That is, the resulting sense signals 174 that are generated in the touch sense electrodes 178 may be transmitted through the sense channels 164 in the touch controller 162. In this way, the touch drive electrodes 86 and touch sense electrodes 178 may form capacitive sensing nodes, or the touch pixels 142. It should be understood that the respective touch drive electrodes 86 and touch sense electrodes 178 may be formed, for example, from dedicated touch drive electrodes 86 and/or dedicated touch sense electrodes 178, and/or may be formed from one or more gate lines 104 of the display 18, one or more pixel electrode 110s of the display 18, one or more common electrodes 112 of the display 18, one or more source lines 106 of the display 18, or one or more drains 118 of the display 18, or some combination of these elements. In addition, at least some portion of the black matrix material of the display 18 may serve as, or supplement, the touch drive electrodes 86 and/or the touch sense electrodes 178 (e.g., the black matrix/touch sense electrodes 80).

Figure 9:
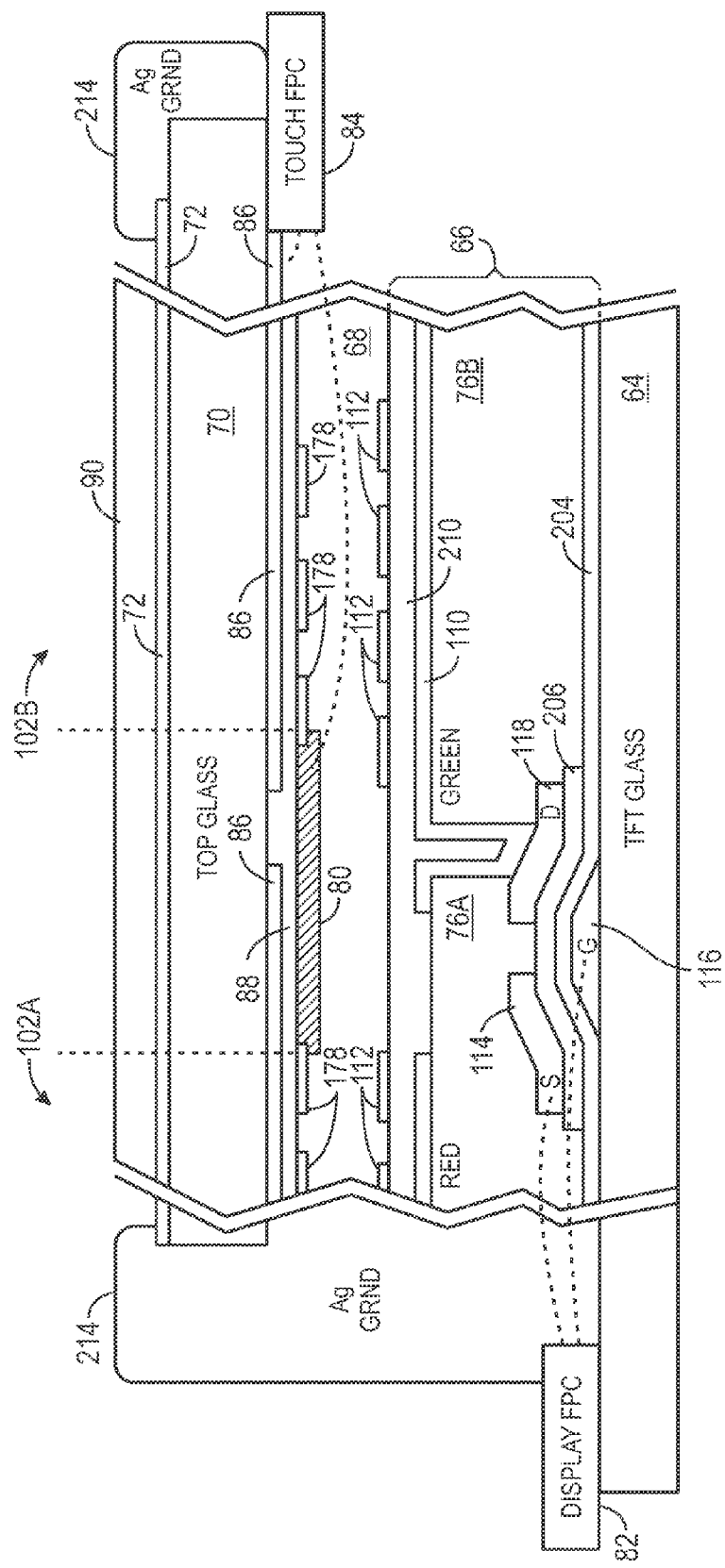
FIGS. 9-12 are schematic illustrations of side views of various layers of an FFS-mode LCD, in which a component of a black matrix is disposed on a top glass assembly and serves as a touch sensor component, in accordance with an embodiment.
Figure 10:
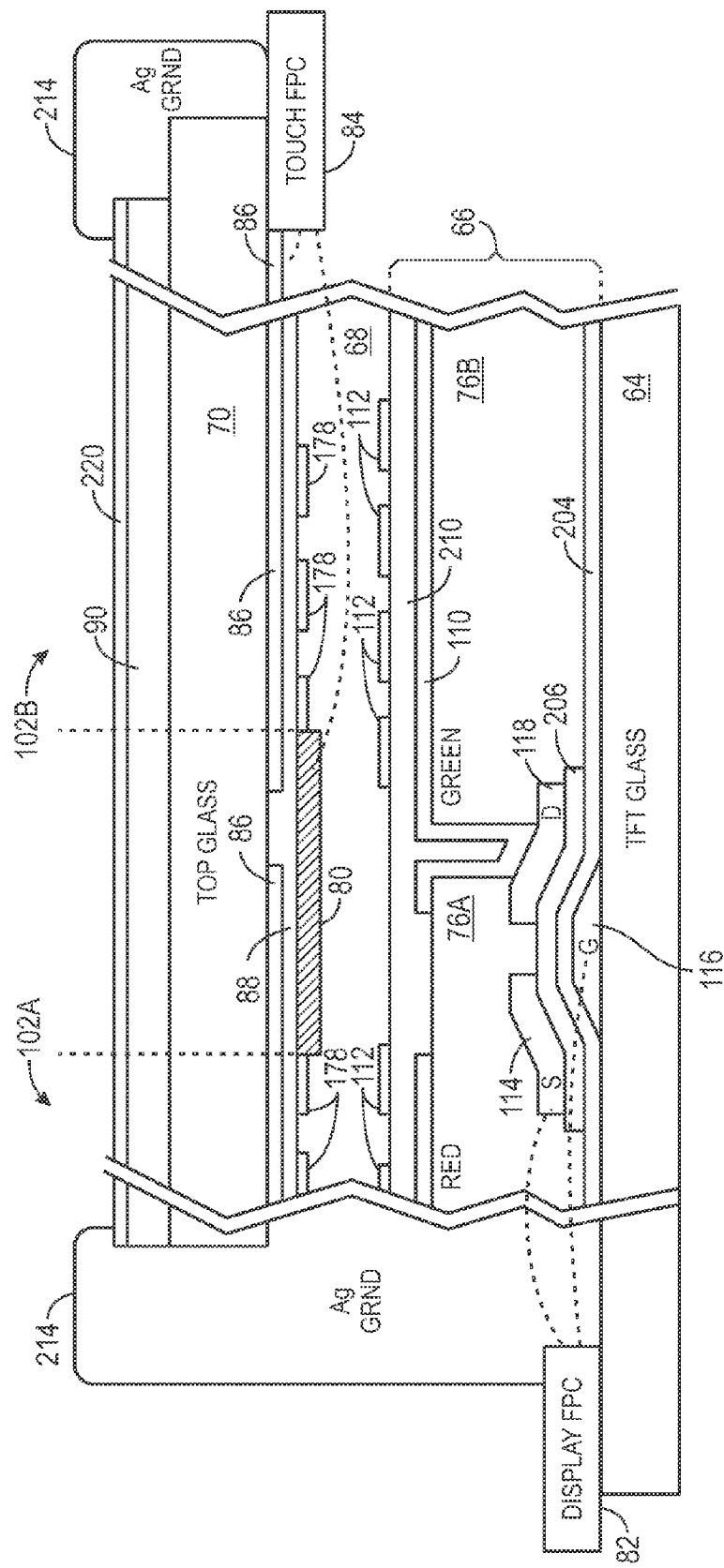

FIGS. 9 and 10 represent schematic side views of various layers that may be employed in the display 18, and generally represent examples of the embodiment of FIG. 4. The examples of FIGS. 9 and 10 illustrate how these various layers may include in-cell/on-cell touch sensor 20 components. The layers of FIGS. 9 and 10 include the TFT glass substrate layer 64, upon which the TFT layer 66 may be formed, the liquid crystal layer 68, the top glass substrate 70, and the high-resistance layer 72. In addition, a touch drive electrode layer 86, a dielectric layer 88, and a black matrix/touch sense electrode 80 are shown as formed on the inward-facing side of the top glass substrate 70. The various layers of FIGS. 9 and 10 are shown to form a red pixel 102a and a green pixel 102b as delineated by black matrix material 138, here represented by the black matrix/touch sense electrode 80. Because the in-cell/on-cell touch sensor 20 components of FIGS. 9 and 10 are formed on the inward-facing side of the top glass substrate 70, capacitive coupling between the in-cell/on-cell touch sensor 20 components and display components may be reduced as compared to being formed on the TFT glass substrate 64. Meanwhile, by being formed on the top glass substrate 70 rather than being a separate touch sensor device, the in-cell/on-cell touch sensor 20 may reduce the complexity and/or weight that would be present otherwise.

It is noted that the examples of FIGS. 9 and 10 differ from one another in that, in FIG. 9, an upper polarizing layer 90 and a high resistance layer 72 may be formed on the outward-facing side of the top glass substrate 70, while in FIG. 10, an anti-static film 220 may be formed on the outward-facing side of the top glass substrate 70 instead of or in addition to the high resistance film 72. It should be noted that, in alternative embodiments, the high resistance layer 72 and/or anti-static film 220 may be formed on an opposite side of the upper polarizing layer 90 from their respective placements in FIGS. 9 and 10.

In the example of FIGS. 9 and 10, the black matrix/touch sense electrode 80 and the touch drive electrode 86 may operate as in-cell/on-cell touch sensor 20 components. As such, the touch FPC 84 may be electrically connected to these components, as schematically illustrated. Since the in-cell/on-cell touch sensor 20 components are formed on the top glass substrate 70, the touch FPC 84 may be bonded to the top glass substrate 70. It may also be noted that the black matrix/touch sense electrode 80 may or may not be electrically connected to a light-transmissive conductive material (e.g., indium tin oxide (ITO)) that form a touch sense electrode 178. In this way, the black matrix/touch sense electrode 80 may lower the effective resistance of the light-transmissive conductive touch sense electrodes 178. It should further be noted that some common grounding material 214 (e.g., a silver (Ag) paste) may keep the high-resistance layer 72 and/or anti-static layer 220 at the same ground potential as the touch FPC 84, the display FPC 82, and any other in-cell components that are grounded.

Display pixel components may be formed in the TFT layer 66. The various layers and components that may be present in the TFT layer 66 may include, for example, the TFT 108, the color filter layer 76 (shown as a red component of the color filter layer (76a) and a green component of the color filter layer (76b)), fingers of pixel electrode 110s, and a common electrode 112. The TFT 108 may include, for example, the gate 116, the source 114 and drain 118. A gate insulator 204 that may be formed from an insulating material (e.g., silicon oxide) and active silicon 206 may be formed between the gate 116 and the source 114 and/or drain 118. When an activation signal is provided to the gate 116 based signals from the display FPC 82, the active silicon 206 may permit charge to flow between the source 114 and the drain 118, allowing a data signal applied to the source 114 to reach the drain 118. As should be appreciated, this data signal may also derive from signals from the display FPC 82. The display FPC 82 may be bonded to the TFT glass substrate 64 and connected to the gate 116 and the source 114 in any suitable manner. Also, as noted above, because the color filter layer 76 may be formed from an organic resin doped to filter red, blue, or green light, and may have a dielectric constant of approximately 4 or less, the color filter layer 76 may serve as an inter-dielectric layer between the TFT 108 and the pixel electrode 110s and common electrode 112.

Although not shown in FIGS. 9 and 10, the drain 118 is electrically connected to the fingers of a pixel electrode 110 of one of the pixels 102 (e.g., the green pixel 102b). A light-transmissive passivation layer 210 may electrically separate the fingers of pixel electrode 110s from the common electrode 112, allowing an electrical field to form between them. Based on the data signal provided to the source 114 when the gate 116 is activated, the electrical field may modulate the liquid crystal of the liquid crystal layer 68, causing a controlled amount of light to pass through the green pixel 102b. It should be appreciated that a top-pixel structure is also applicable in other embodiments.

In the example of FIGS. 9 and 10, the black matrix/touch sense electrode 80 may be formed from any suitable opaque metal (e.g., Cr/CrO$_x$, or any other metals or other conducting polymer or hybrid with metal and organic black matrix, and so forth). When additional touch sense electrodes 178 are employed, the black matrix/touch sense electrode 80 may reduce the resistance of these touch sense electrodes 178, which may be formed from indium tin oxide (ITO) and may have a higher resistance than the black matrix/touch sense electrode 80 material.

A common grounding material 214, which is illustrated as a silver (Ag) paste, but which may be formed from any suitable conductive material, may be used to provide a uniform ground to components of the top glass substrate 70 and elements disposed on the TFT glass substrate 64. For example, the high resistance layer 72 on the top glass substrate 70 may be maintained at the same ground potential as the display FPC 82 and touch FPC 84. In some embodiments, the common electrode 112 voltage (Vcom) also may be maintained at a ground potential through the use of the grounding conductor 214.

Figure 11:
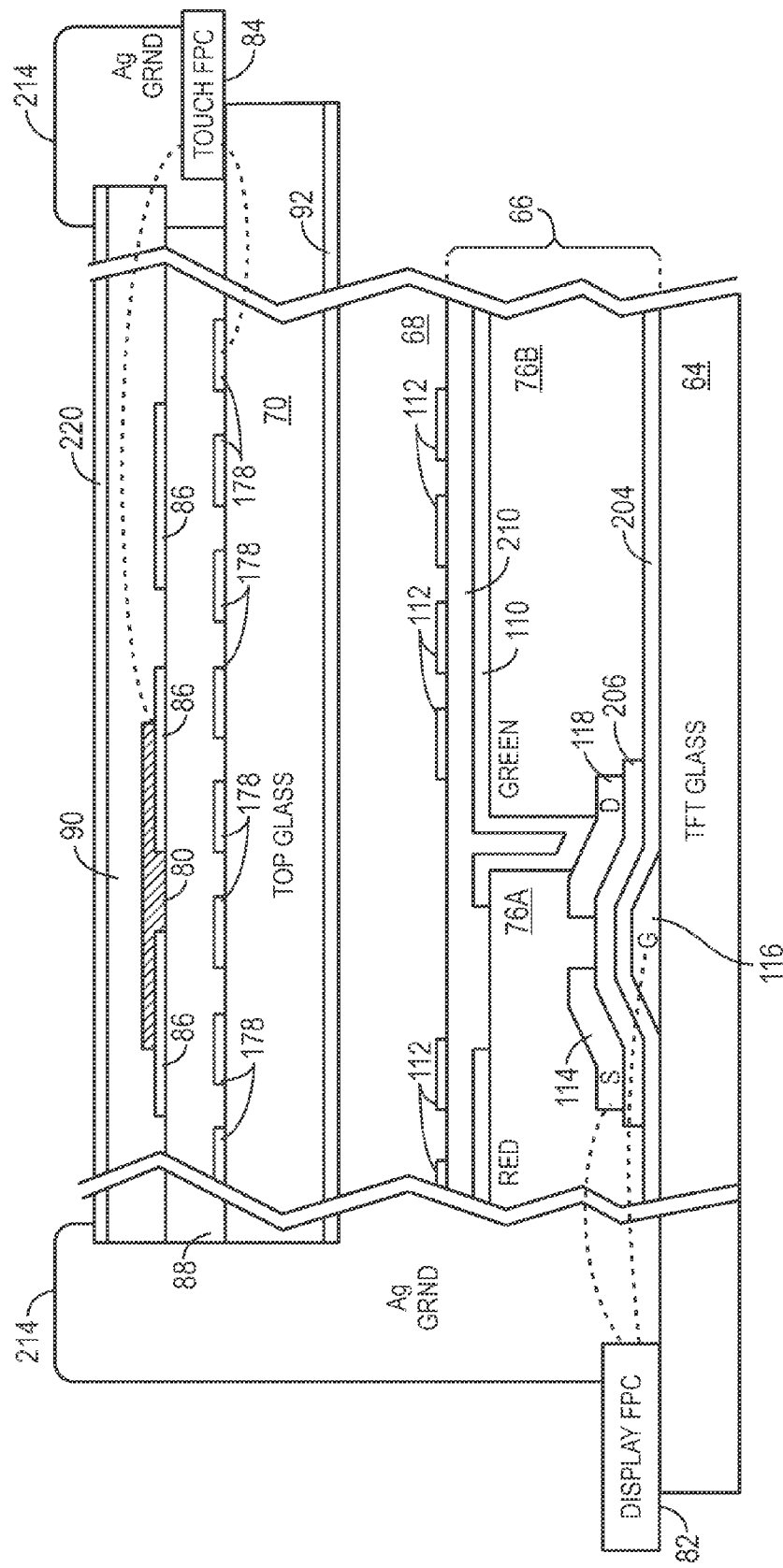
Figure 12:
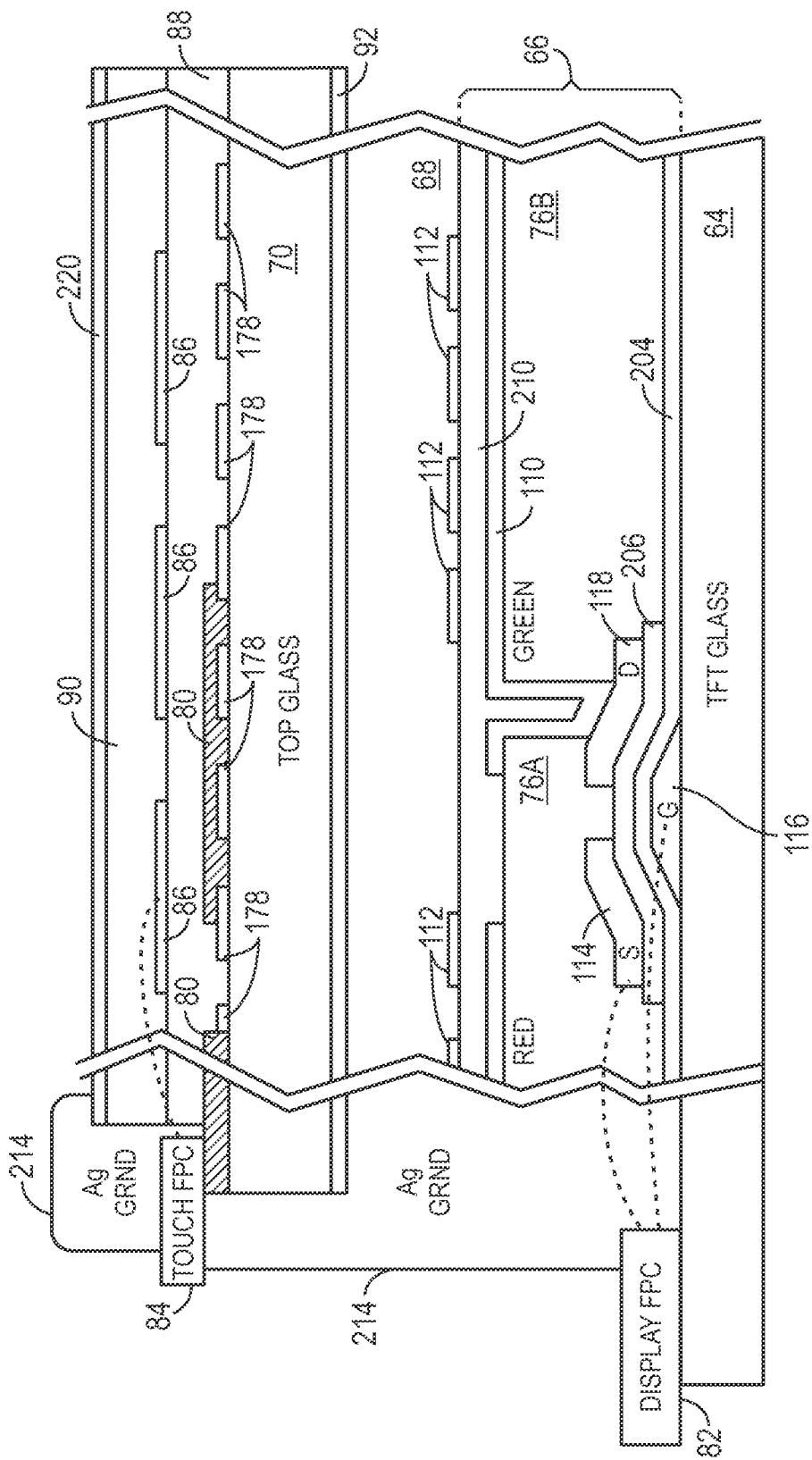

FIGS. 11 and 12 represent schematic side views of various layers that may be employed in the display 18, and generally represent examples of the embodiment of FIGS. 5 and 6, respectively. Like elements of FIGS. 11 and 12 that appear in FIGS. 9 and 10 are not discussed further, but should be understood to generally operate in the same manner. Both FIGS. 11 and 12 include in-cell/on-cell touch sensor 20 components formed on the outward-facing side of the top glass substrate 70 and the shielding layer 92 formed on the inward-facing side of the top glass substrate 70.

In FIG. 11, the touch sense electrodes 178 are shown to be formed on the outward-facing side of the top glass substrate 70, above which the dielectric layer 88 may be formed. The black matrix 80 and touch drive electrodes 86 may be formed above the dielectric layer 88. The upper polarizing layer 90 coupled to the high resistance and/or anti-static film 220 may be formed above the black matrix/touch drive electrodes. Because the in-cell/on-cell touch sensor 20 components may be formed on outward-facing side of the top glass substrate 70, the touch FPC 84 may be bonded to the outward-facing side of the top glass substrate 70. As schematically illustrated in FIG. 11, the touch FPC 84 may be operably coupled to the black matrix 80, touch sense electrodes 178, and the touch drive electrodes 86.

In FIG. 12, the black matrix/touch sense electrodes 80 are shown to be formed on the outward-facing side of the top glass substrate 70. The dielectric layer 88, the touch drive electrodes 86, and upper polarizing layer 90 coupled to the high resistance and/or anti-static film 90 may be disposed above the on-cell portions of the black matrix/touch sense electrodes 80. In a peripheral portion of the black matrix/touch sense electrodes 80, which are not disposed directly above the display pixel cells, the touch FPC 84 may be bonded directly to the black matrix/touch sense electrodes 80. As schematically indicated in FIG. 12, the touch FPC 84 may also be operably coupled to the touch drive electrodes 86.

Figure 13:
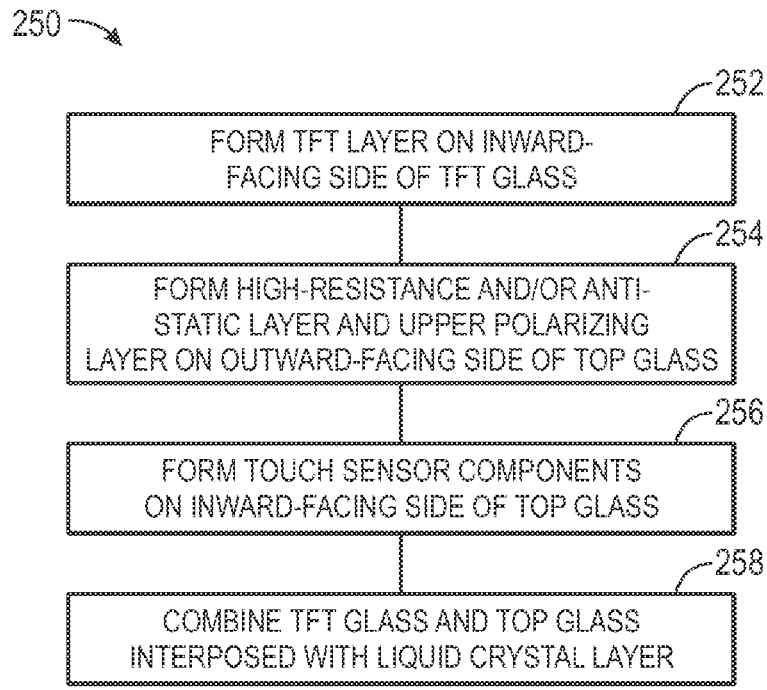
FIGS. 13-14 are flowcharts describing embodiments of methods for manufacturing the LCD of FIGS. 9 and 10 and FIGS. 11 and 12, respectively.

As represented by a flowchart 250 of FIG. 13, manufacturing the examples shown in FIGS. 9 and 10 may involve forming the TFT layer 66 on the inward-facing side of the TFT glass substrate 64 (block 252) and forming the high-resistance layer 72 and/or anti-static film 220 and the upper polarizing layer 90 on the outward-facing side of the top glass substrate 70 (block 254). Additionally, the touch drive electrodes 86, dielectric layer 88, and black matrix/touch sensor electrodes 80 may be formed on the inward-facing side of the top glass substrate 70 (block 256). A liquid crystal layer 68 then may be placed between the inward-facing sides of the TFT glass substrate 64 and the top glass substrate 70 as they are combined (block 258).

Figure 14:
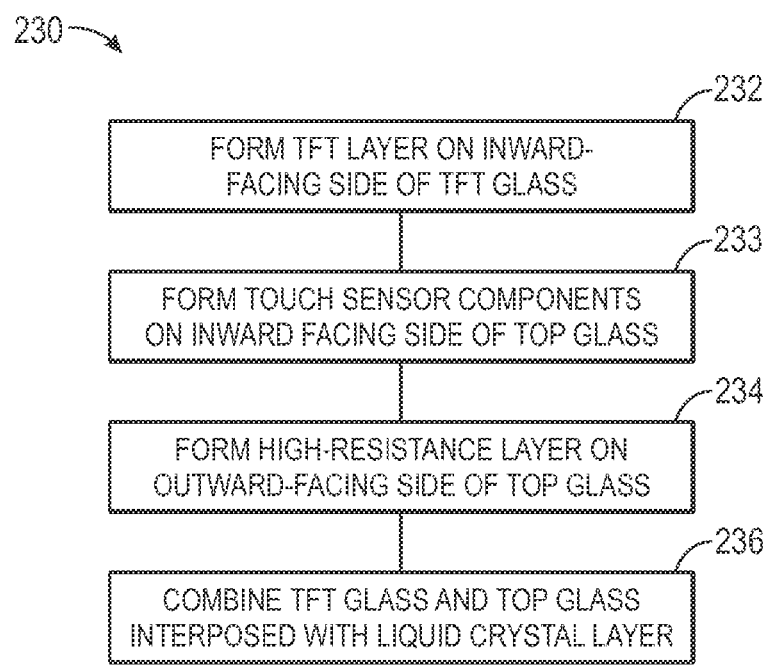

Similarly, as represented by a flowchart 230 of FIG. 14, manufacturing the examples shown in FIGS. 11 and 12 may involve forming the TFT layer 66 on the inward-facing side of the TFT glass substrate 64 (block 232). Additionally, the shielding layer 92 may be formed on the inward-facing side of the top glass substrate (block 233). Also, the black matrix/touch sensor electrodes 80, the dielectric layer 88, and the touch drive electrodes 86, as well as the high-resistance layer 72 and/or the anti-static layer 220, may be formed on the outward-facing side of the top glass substrate 70 (block 234). A liquid crystal layer 68 then may be placed between the inward-facing sides of the TFT glass substrate 64 and the top glass substrate 70 as they are combined (block 236).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:
1. An electronic display comprising:
   a touch drive electrode comprising a first common electrode configured to be supplied a first common voltage; and
   touch sense electrodes configured to detect a user touch based at least in part on a capacitance formed between the touch drive electrode and the touch sense electrodes, wherein the touch sense electrodes comprise:
   a first substantially light-transmissive touch sense electrode and a second substantially light-transmissive touch sense electrode, wherein the first substantially light-transmissive touch sense electrode and the second substantially light transmissive touch sense electrode comprise a second common electrode config- ured to be supplied a second common voltage different from the first common voltage; and a conductive portion of a black matrix material, wherein the black matrix material is configured to shield light between pixels of the electronic display and the conductive portion of the black matrix material is configured to supplement the first substantially light-transmissive touch sense electrode and the second substantially light-transmissive touch sense electrode.

2. The electronic display of claim 1, wherein the black matrix material is formed in a touch sensor layer on an inward-facing side of an upper substrate and is configured to be disposed over two differently colored organic resin filters in a thin film transistor layer disposed on a lower substrate.

3. The electronic display of claim 1, wherein the conductive portion of the black matrix material is configured to provide a signal indicating whether an object is located nearby through self capacitance or mutual capacitance with the touch drive electrode.

4. The electronic display of claim 1, wherein the black matrix material is disposed directly on a dielectric layer on an inward facing side of an upper substrate.

5. The electronic display of claim 1, wherein the black matrix material is disposed directly on an inward facing side of an upper substrate.

6. A method of manufacturing an electronic display panel comprising:
  forming a touch sensor layer over an inward facing side of a top glass substrate, wherein forming the touch sensor layer comprises:
    forming a touch sense electrode over the inward facing side of the top glass substrate, wherein the touch sense electrode comprises a first common electrode;
    forming a dielectric layer over the inward facing side of the top glass substrate;
    forming a first substantially light-transmissive touch drive electrode and a second substantially light-transmissive touch drive electrode over the inward facing side of the top glass substrate, wherein the first substantially light-transmissive touch drive electrode and the second substantially light-transmissive touch drive electrode comprise a second common electrode;
    electrically connecting a common voltage source to the first common electrode and the second common electrode to enable the common voltage source to supply a first common voltage to the first common electrode and a second common voltage different from the first common voltage to the second common electrode; and
    forming a conductive portion of a black matrix material over the inward facing side of the top glass substrate, wherein the black matrix material is configured to separate a plurality of display pixels in the electronic display panel and the conductive portion of the black matrix material is configured to supplement the first substantially light-transmissive touch drive electrode and the second substantially light-transmissive touch drive electrode.

7. The method of claim 6, wherein the first substantially light-transmissive touch drive electrode and the second substantially light transmissive touch drive electrode are adjacent.

8. The method of claim 6, wherein forming the touch sensor layer comprises:

forming the touch sense electrode directly on the inward facing side of the top glass substrate;
forming the dielectric layer directly on the touch sense electrode;
forming the first substantially light-transmissive touch drive electrode and the second substantially light-transmissive touch drive electrode directly on the dielectric layer; and
forming the conductive portion of the black matrix material directly on the dielectric layer, the first substantially light-transmissive touch drive electrode, and the second substantially light-transmissive touch drive electrode.

9. An electronic device comprising:
data processing circuitry configured to perform an operation based at least in part on detection of a user touch; and
an electronic touch-screen display configured to:
  detect the user touch based at least in part on a first capacitive interaction between a substantially light-transmissive touch drive electrode, a first touch sense electrode, and a user body part, wherein the substantially light-transmissive touch drive electrode comprises a first common electrode;
  detect the user touch based at least in part on a second capacitive interaction between a second touch sense electrode, a black matrix touch drive electrode, and the user body part, wherein the second touch sense electrode comprises a second common electrode, and the black matrix touch drive electrode is configured to supplement the substantially light-transmissive touch drive electrode; and
  display an image by supplying a first common voltage to the first common electrode and a second common voltage to the second common electrode.

10. The electronic device of claim 9, wherein the black matrix touch drive electrode is configured to facilitate reducing overall resistance of the electronic touch-screen display.

11. The electronic device of claim 9, wherein the black matrix touch drive electrode comprises a substantially opaque conductive material having a lower electrical resistance than the substantially light-transmissive touch drive electrode.

12. A method for manufacturing an electronic display panel comprising:
  forming a touch sensor layer over an inward-facing side of an upper substrate, wherein forming the touch sensor layer comprises:
    forming a first touch drive electrode and a second touch drive electrode over the inward-facing side of the upper substrate, wherein the first touch drive electrode and the second touch drive electrode comprise a first common electrode;
    forming a dielectric layer over the inward-facing side of the upper substrate;
    forming a substantially light-transmissive touch sense electrode over the inward-facing side of the upper substrate, wherein the substantially light transmissive touch sense electrode comprises a second common electrode;
    electrically connecting a common voltage source to the first common electrode and the second common electrode to enable the common voltage source to supply a first common voltage to the first common electrode and a second voltage to the second common electrode; and
    forming a conductive portion of a black matrix material over the inward-facing side of the upper substrate, wherein the black matrix material is configured to separate a plurality of display pixels in the electronic display panel and the conductive portion of the black matrix material is configured to supplement the substantially light-transmissive touch sense electrode.

13. The method of claim 12, wherein forming the touch sensor layer comprises:
forming the first touch drive electrode and the second touch drive electrode directly on the inward-facing side of the top glass substrate;
forming the dielectric layer directly on the first touch drive electrode and the second touch drive electrode;
forming the substantially light-transmissive touch sense electrode directly on the dielectric layer; and
forming the conductive portion of the black matrix material directly on the dielectric layer and the substantially light-transmissive touch sense electrode.

14. The method of claim 12, wherein the touch sensor layer is formed at least in part in the recited order.

15. The electronic display of claim 1, wherein the touch drive electrode comprise a gate line, a source line, a drain line, or a pixel electrodes.

16. The electronic display of claim 1, wherein the touch sense electrodes comprise one or more gate lines, one or more source lines, one or more drain lines, one or more pixel electrodes, or any combination thereof.

17. The electronic display of claim 1, wherein:
the touch drive electrode is configured to receive drive signals; and
the touch sense electrodes are configured to generate sense signals based at least in part on capacitive interaction between a user body part and the drive signals to indicate occurrence of a user touch.

18. The electronic display of claim 1, wherein the first common electrode and the second common electrode are electrically isolated.

19. The electronic display of claim 1, comprising a common voltage source configured to supply the first common voltage to the first common electrode and the second common voltage to the second common electrode.

20. The method of claim 6, wherein the first common electrode and the second common electrode are electrically isolated.

21. The electronic device of claim 9, wherein the first touch sense electrode comprises a gate line, a source line, a drain line, a pixel electrode, or any combination thereof.

22. The electronic device of claim 9, wherein the electronic touch-screen display comprises a common voltage source configured to supply the first common voltage to the first common electrode and the second common voltage to the second common electrode.

23. The electronic device of claim 9, wherein the first common voltage and the second common voltage are different.

24. The electronic device of claim 9, wherein the black matrix touch drive electrode comprises a conductive portion of a black matrix configured to shield light between pixels of the electronic display.

25. The electronic device of claim 9, wherein the first common electrode and the second common electrode are electrically isolated.

26. The electronic device of claim 9, wherein:
the substantially light transmissive touch drive electrode and the black matrix touch drive electrode are configured to receive drive signals;
the first touch sense electrode is configured to generate first sense signals to indicate occurrence of the user touch at the first touch sense electrode; and
the second touch sense electrodes is configured to generate second sense signals to indicate occurrence of the user touch at the second touch sense electrode.

27. The method of claim 12, wherein the first common electrode and the second common electrode are electrically isolated.

28. The method of claim 12, wherein the first common voltage and the second common voltage are different.

* * * * *